US006999984B2

(12) United States Patent
Lam

(10) Patent No.: US 6,999,984 B2
(45) Date of Patent: Feb. 14, 2006

(54) MODIFICATION TO RECONFIGURABLE FUNCTIONAL UNIT IN A RECONFIGURABLE CHIP TO PERFORM LINEAR FEEDBACK SHIFT REGISTER FUNCTION

(75) Inventor: Peter Shing Fai Lam, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 495 days.

(21) Appl. No.: 09/989,529

(22) Filed: Nov. 21, 2001
(Under 37 CFR 1.47)

(65) Prior Publication Data

US 2002/0165886 A1    Nov. 7, 2002

Related U.S. Application Data

(60) Provisional application No. 60/288,291, filed on May 2, 2001.

(51) Int. Cl.
 *G06F 1/02* (2006.01)
(52) U.S. Cl. .................................... 708/252; 708/256
(58) Field of Classification Search ............... 708/230, 708/232, 250, 252, 253, 256
 See application file for complete search history.

(56) References Cited

U.S. PATENT DOCUMENTS 4,536,881 A * 8/1985 Kasuya ....................... 377/70
5,737,422 A * 4/1998 Billings ...................... 713/159
6,014,408 A * 1/2000 Naruse et al. ............... 375/130

6,061,417 A * 5/2000 Kelem ......................... 377/26
6,181,164 B1 * 1/2001 Miller ......................... 326/46

OTHER PUBLICATIONS

Chameleon Systems, Inc., Product Overview sheet for CS2000 Reconfigurable Communications Processor, ©2000.
Chameleon Systems, Inc., Family Product Brief for CS2000 Reconfigurable Communications Processor, Advance Produce Information, ©2000.
Glaskowsky, "Chameleon Crosses CPU, FPGA," Microdesign Resources, Jun. 12, 2000.
Dave Bursky [Editor-in-Chief], "Comm Processor Adjusts For Task At Hand," Electronic Design, May 15, 2000 p. 66 et seq.
Graham Mostyn, "Benefits of Reconfigurable Processors for Communication System Design," Communication Systems Design, Jan. 2000.
"Reconfigurable hit comms processing," Electronic Engineering Times, May 22, 2000.
Crista Souza, "Semiconductors: Chameleon a quick-change artist," Electronic Buyers' News, May 22, 2000.

* cited by examiner

Primary Examiner—Chuong D Ngo
(74) Attorney, Agent, or Firm—Lanny Parker

(57) ABSTRACT

A reconfigurable chip using reconfigurable functional units is modified to better implement linear feedback shift registers. The reconfigurable functional unit has its input multiplexer unit modified so that it can select a combined value. The combined values include some of the bits from the output of the reconfigurable functional unit as well as carry bit from another reconfigurable functional unit. This can significantly reduce the space required to implement linear feedback shift registers which are useful in many digital communication systems.

21 Claims, 9 Drawing Sheets

MODIFICATION TO RECONFIGURABLE FUNCTIONAL UNIT IN A RECONFIGURABLE CHIP TO PERFORM LINEAR FEEDBACK SHIFT REGISTER FUNCTION

RELATED APPLICATION

This application claims priority of the provisional application filed May 2, 2001, Ser. No. 60/288,291.

BACKGROUND OF THE INVENTION

Linear Feedback Shift Registers have many uses in digital communications systems. One use is the generation of a long sequence of pseudo-random numbers. FIG. 1 illustrates an example of a linear feedback shift register (LFSR). The LFSR uses a number of shift register elements to store state information. Some of the inputs are determined by exclusive ORing the output of the previous shift register with an output bit of the LFSR.

It is desired to find an improved way of implementing linear feedback shift registers in reconfigurable logic.

SUMMARY OF THE PRESENT INVENTION

A modified reconfigurable functional unit on a reconfigurable chip is designed to better implement the linear feedback shift registers. A modified input multiplexer unit in the reconfigurable functional unit allows the selection of a combined value. The combined value includes a shifted version of some of the bits from an output of the reconfigurable functional unit, and at least one bit from the another reconfigurable functional unit.

In a preferred embodiment, at least one bit from the another reconfigurable functional unit is a carry bit. The another reconfigurable functional unit is configured to add an input value to itself and produce the carry bit, the carry bit thus being the most significant bit of the input value.

In one embodiment, the first reconfigurable functional unit is configured to add an input value to itself so that a carry bit contains the most significant bit of the input value. The second reconfigurable functional unit has a modified input multiplexer unit configured to select a combined value, the combined value including all but one bit of the output of the second configurable functional unit and the carry over bit from the reconfigurable functional unit. If the most significant bit of the output of the second reconfigurable functional unit is in a predetermined state (for example, state "1"), the second reconfigurable functional unit is configured to provide a mask value from the register and the second reconfigurable functional unit is configured to Exclusive-OR the combined value to the mask value to provide the new output value. In a preferred embodiment, if the most significant of the output of the second reconfigurable functional unit is not in the predetermined state, the combined value is used as the new output value.

The modified input multiplexer unit allows a linear feedback shift register to be implemented in a relatively small number of reconfigurable functional units. The modification to the input multiplexer unit is not substantial and, thus, this modification can increase the efficiency of the entire reconfigurable chip for the many communications oriented implementations that require linear feedback shift registers.

DETAILED DESCRIPTION OF THE PREFERRED EMBODIMENT

Reconfigurable chips are typically implemented using reconfigurable functional units, such as data path units, interconnected by reconfigurable interconnect elements. In one embodiment, the reconfigurable functional unit can be connected with a local state memory to store data on the chip. The reconfigurable functional units and the interconnect are configured by configuration memory that stores the configurations of the system.

Figure 1:
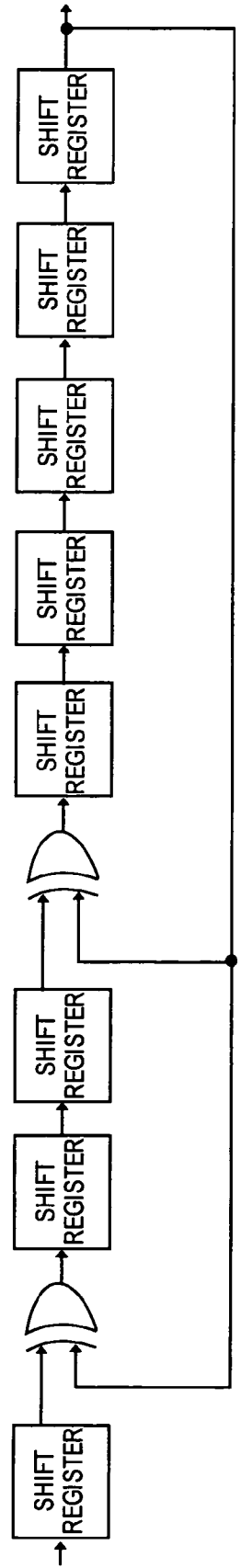
FIG. 1 is a diagram of a prior art linear feedback shift register.
Figure 2:
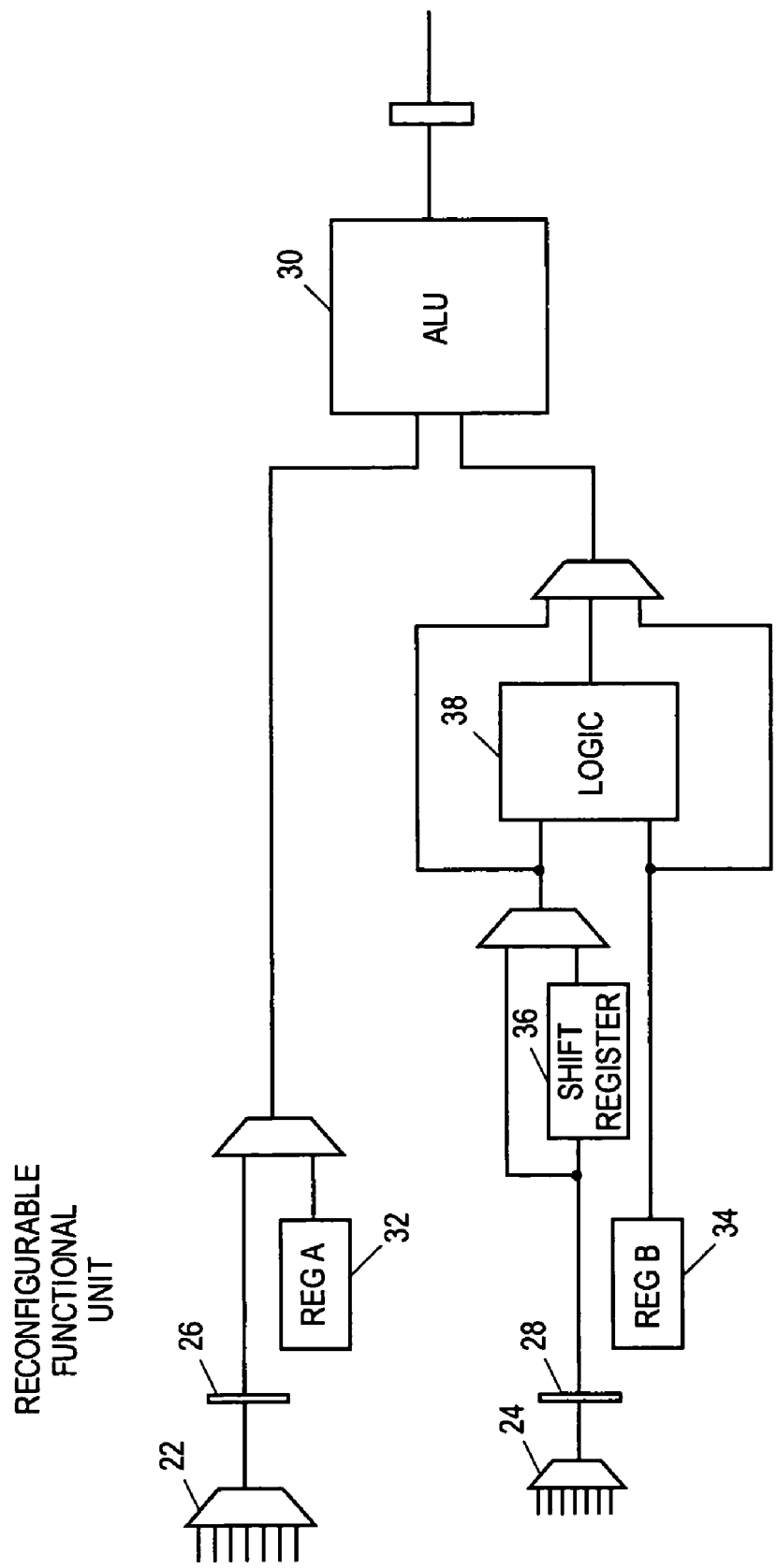
FIG. 2 is a diagram of a reconfigurable functional unit of one embodiment of the present invention.

An example of a reconfigurable functional unit is shown in FIG. 2. The reconfigurable functional unit includes two input multiplexers 22 and 24. Connected to the input multiplexers are registers 26 and 28. The reconfigurable functional unit includes an arithmetic logic unit 30, which can be configured to implement a number of different functions. Inputs to the arithmetic logic unit 30 can be the direct inputs from the input multiplexers 22 and 24; the values in a register, such as registers 32 and 34; shifted values from shift register 36; or values from logic 38. The configuration memory used to set up the configuration of the multiplexers, shift register logic, and arithmetic logic unit are not shown.

It is desirable to implement a configuration such as a linear feedback shift register in as few reconfigurable functional units as possible, so as to minimize the resources used by that portion of the design.

FIGS. 3–7 illustrate a modification to the reconfigurable functional unit to make it better able to implement the linear feedback shift register.

Figure 3:
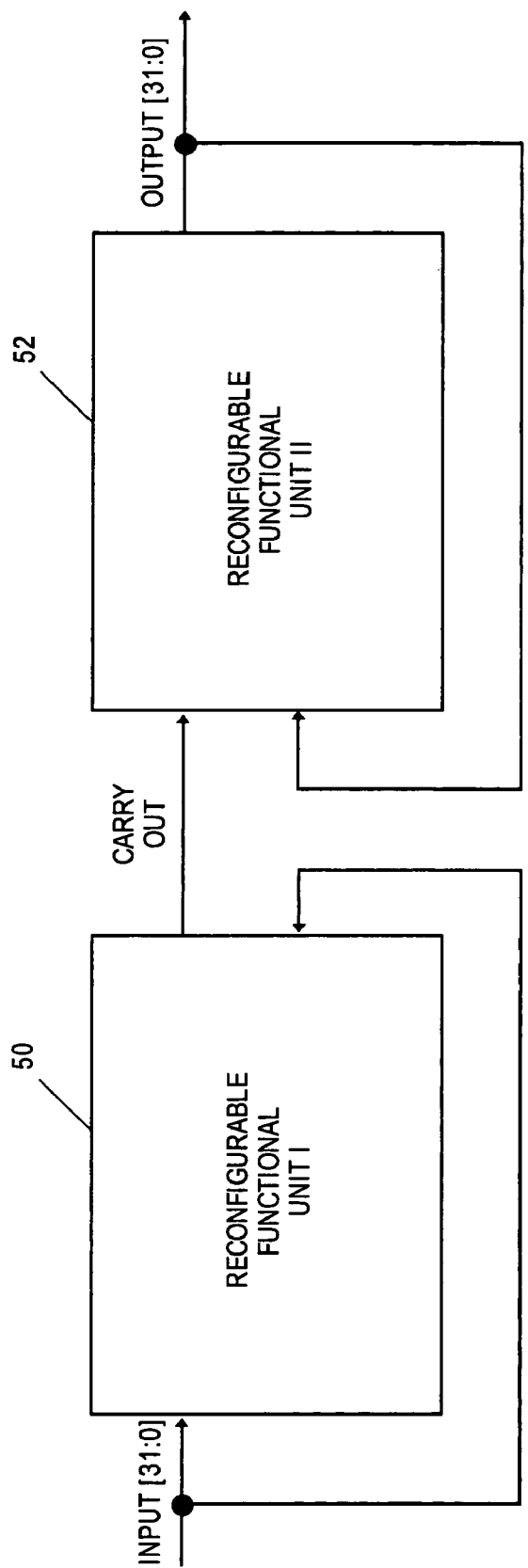
FIG. 3 is a diagram of two reconfigurable functional units interconnected to implement a linear feedback shift register.

FIG. 3 shows two reconfigurable functional units 50 and 52. In order to implement the linear feedback shift register, as described below, one of the input multiplexer units is modified such that it can produce a combined value. The reconfigurable functional unit 50 is implemented so that it adds input value to itself. In this manner, the carry bit of the input contains the most significant bit of the input. The sum value is a left-shifted one bit. As will be described below, the carry bit from the reconfigurable functional unit 50 is used by the modified input multiplexer unit in the reconfigurable functional unit 52 to produce the combined value. The combined value includes some of the bits of the reconfigurable functional unit 52, as well as the carry bit from the reconfigurable functional unit 50.

Figure 4:
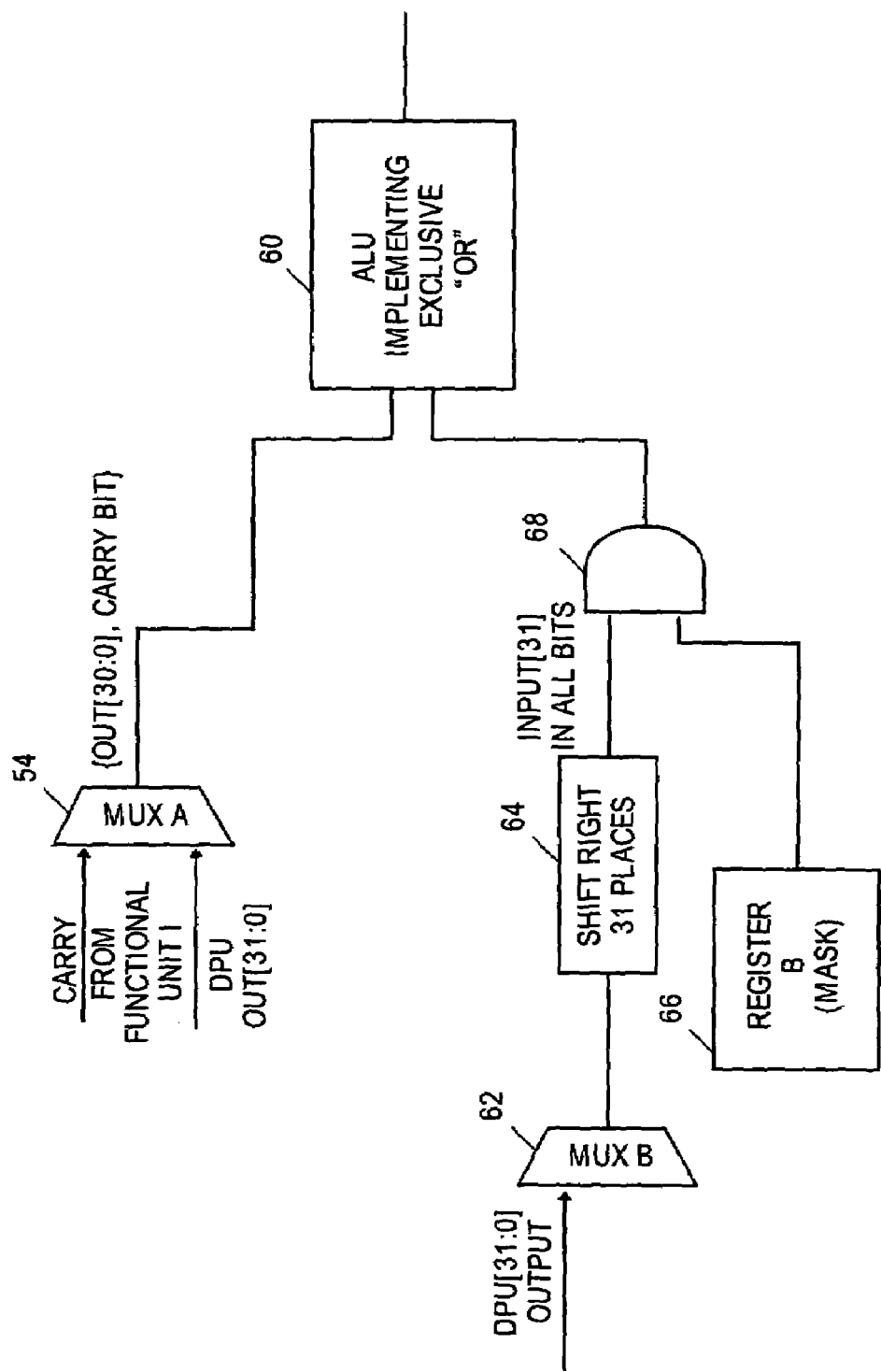
FIG. 4 is a diagram of the second reconfigurable functional unit implementing the linear feedback shift register.

FIG. 4 illustrates the operation of the reconfigurable functional unit 52'. The elements of the reconfigurable functional unit that are not used in this implementation are not shown. Looking at FIG. 4, the input mux A 54 is modified so that a combined value can be selected. The combined value uses the output from the data pack unit 52' except for the most significant bit. The combined value also includes the carry bit which is provided from the reconfigurable functional unit 50, shown in FIG. 3. This modification to the input multiplexer unit 54 makes it possible to implement the linear feedback shift register into reconfigurable functional units without using a lot of space to make the modifications to the reconfigurable functional unit. Examples of modifications to the multiplexer unit are shown below with respect to FIGS. 5, 6 and 7.

The combined value is sent to the Arithmetic Logic Unit (ALU) 60, which implements an exclusive OR. The output of the data path unit 52' also is sent through mux 62 to be shifted right thirty-one places (for a thirty-two-bit word) in the shift unit 64. This causes the input value of the most significant bit to fill the entire word. This value is ANDed together with the contents of Register B 66 which contains the mask value. If the most significant bit of the output of the reconfigurable functional 52' is a predetermined value, in this case a "2," the output of the AND 68 will be the mask value from register B 66. Otherwise, the output of AND 68 will all zeros. The output of the AND 68 is Exclusive ORed with the combined value in the ALU 60.

Figure 9:
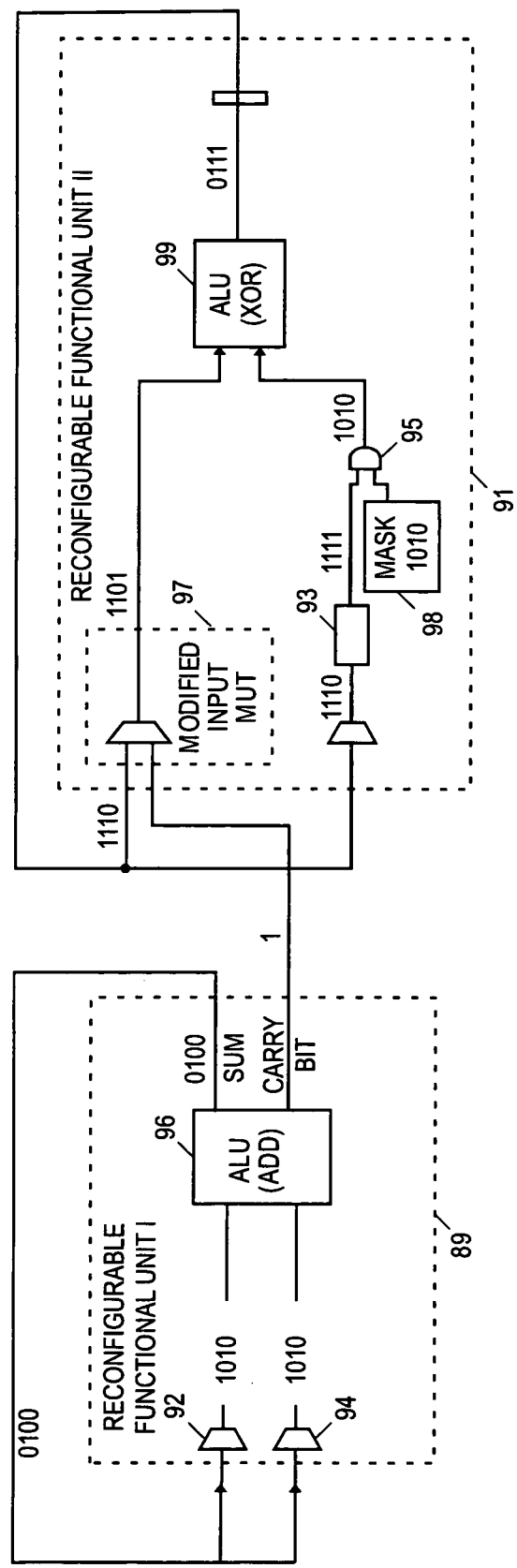
FIG. 9 is an illustration of a simplified implementation of a linear feedback shift register of FIGS. 8A and 8B.

FIG. 9 below illustrates how the reconfigurable functional units 50 and 52 implement the linear feedback shift register with respect to a simplified example.

Figure 5:
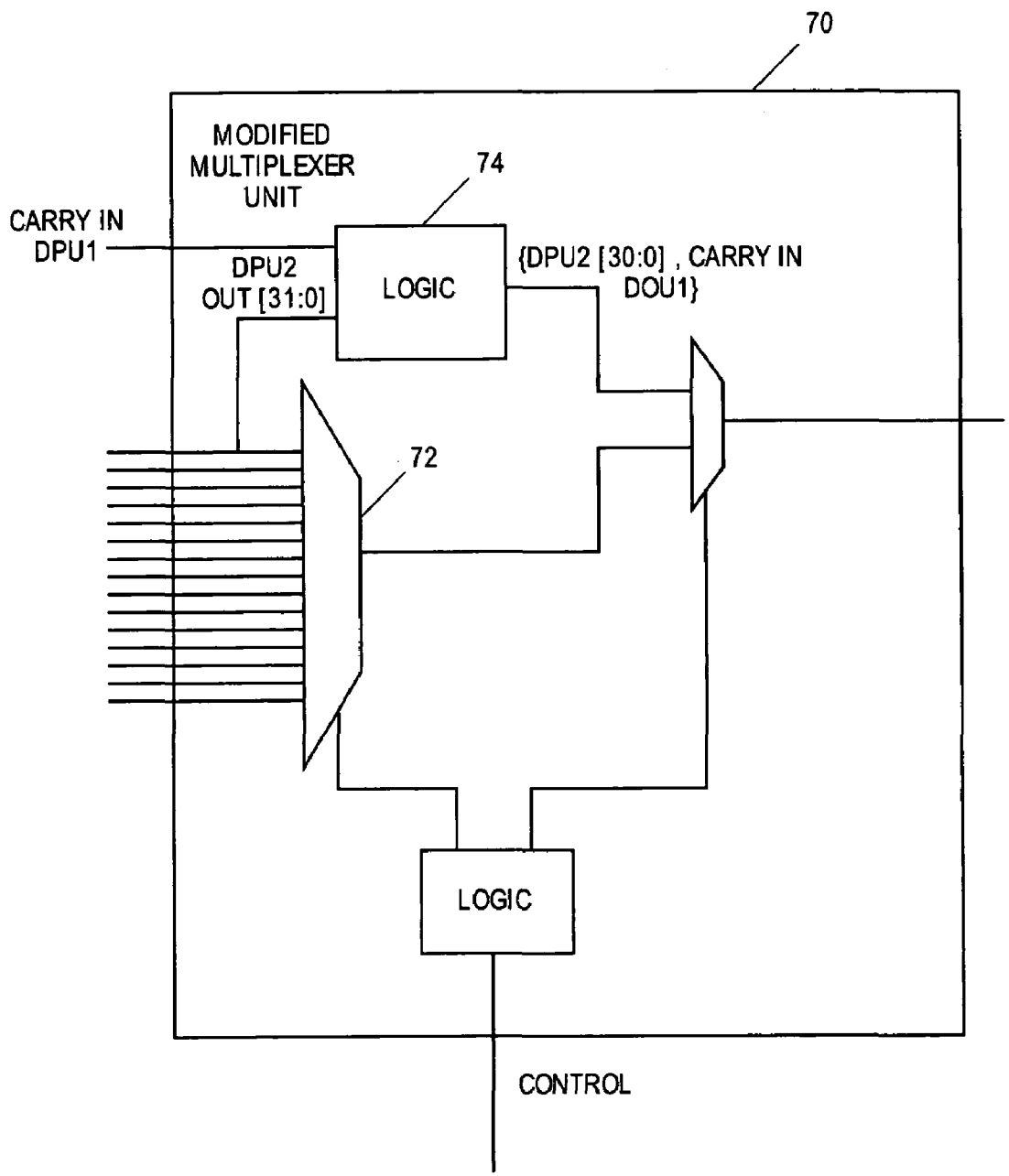
FIG. 5A is a diagram of a modified input multiplexer unit for use in the reconfigurable functional unit of the present invention.

FIG. 5 illustrates one example of a modified multiplexer unit. Logic 74 produces the combined value. The combined value including the carry bit from the first reconfigurable functional unit, as well as some of the bits of the output of the second reconfigurable functional unit.

Figure 6:
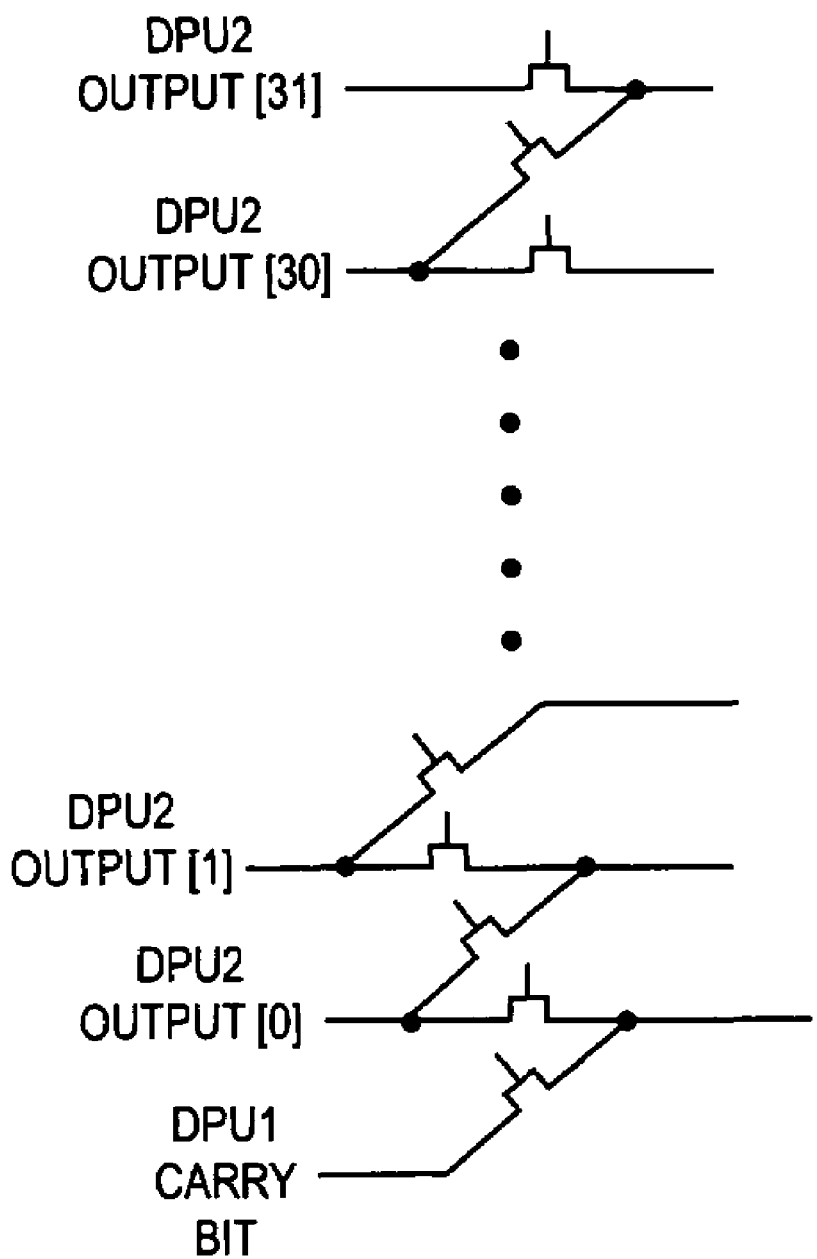
FIG. 6 is a diagram of one embodiment of logic that can be used in a modified input multiplexer unit of the present invention.

FIG. 6 is a diagram illustrating logic in which two sets of pass gates are shown. The horizontal pass gates cause the output of the circuit to be the reconfigurable functional blocks output. The diagonal pass gates cause the least significant bit to be the carry bit from the first reconfigurable functional unit and the other bits to be the shifted version of all but the most significant bit of the output of the second reconfigurable functional unit.

Figure 7:
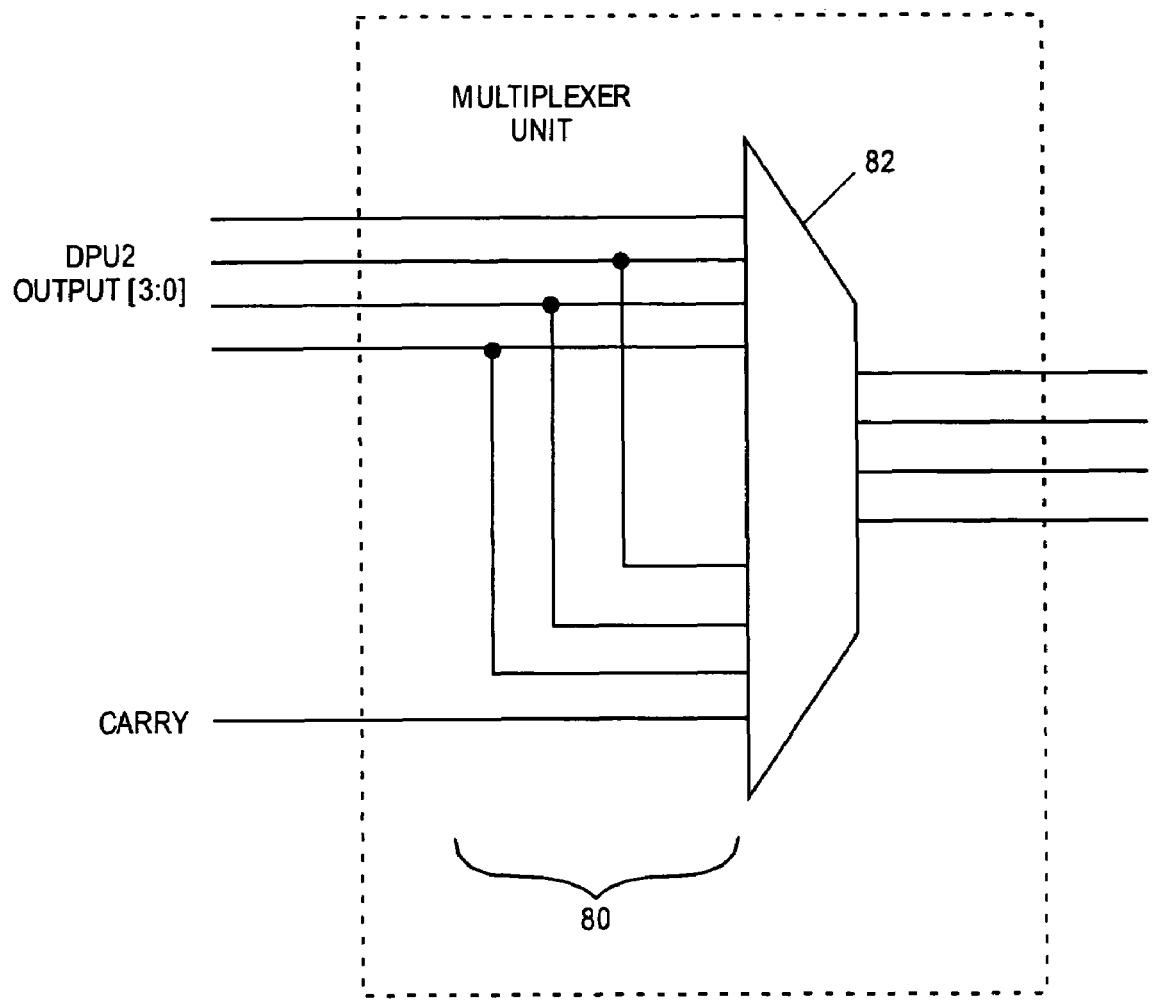
FIG. 7 is a diagram of an alternate embodiment of a modified input multplexer unit of the present invention.

FIG. 7 is another diagram of an alternate modified input multiplexer unit. This simplified diagram shows a four-bit example of the multiplexing between the combined value and the output of the second reconfigurable functional unit. Note that the multiplexer unit of FIG. 7 is comprised of wiring 80 and a conventional multiplexer unit 82. Other implementations of a modified input multiplexer unit can be provided to select a combined value.

Figure 8A:
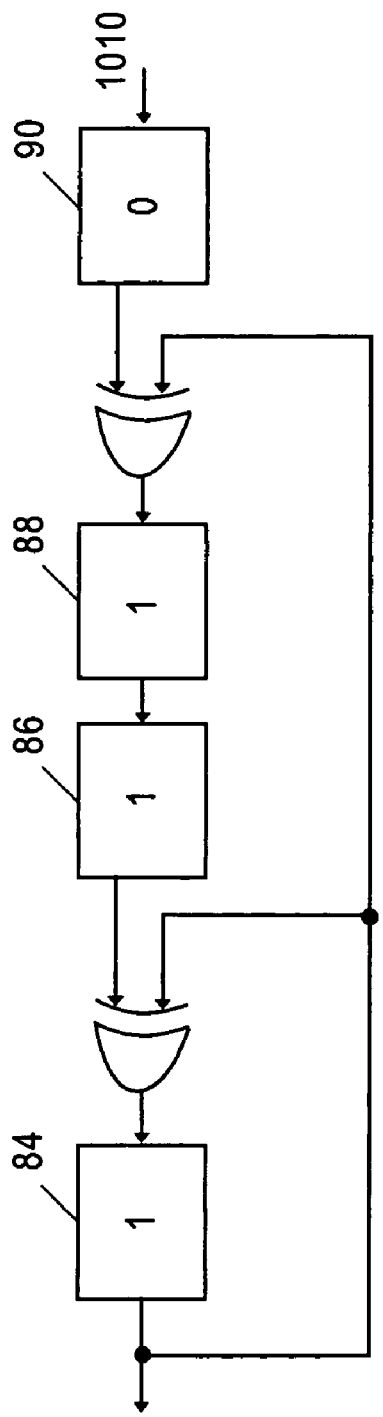
FIGS. 8A and 8B are simplified illustrations of an implementation of a linear feedback shift register.
Figure 8B:
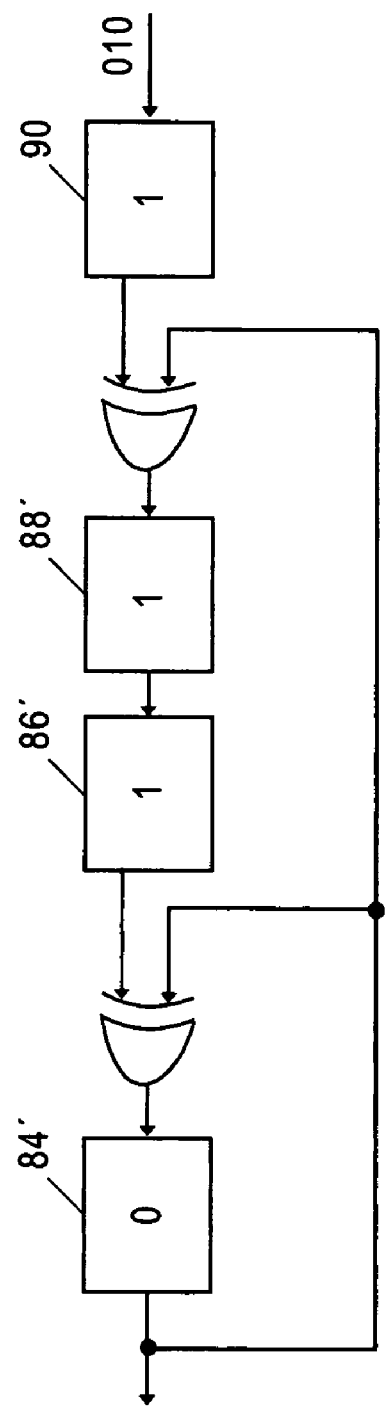

FIGS. 8A and 8B illustrate an example of the operation of a linear feedback shift register. In FIG. 8A, the contents of the linear feedback shift register state is 1110. When a bit 1 is loaded into the linear feedback shift register, the content of the register 90' becomes 1. The content of register 81' becomes 1, (the exclusive ORing of the output of registers 90 and 84 is a 1). The content of register 86' is a 1. The content of register 84' is 0, (the exclusive ORing of the outputs of registers 86 and 84 is a 0).

FIG. 9 illustrates how the linear feedback shift register is implemented using reconfigurable functional units of the present invention. The simplified example of FIG. 9 is a four-bit example that follows the example of FIGS. 8A and 8B. In the preferred embodiment, larger-sized LFSR are implemented. In the example of FIG. 9, the reconfigurable functional unit 90 is configured such that the output of the reconfigurable functional unit 90 is sent through the input multiplexers 92 and 94, then added together in the ALU unit 96. The input value 1010 is the same as the input stream to the linear feedback shift registers of FIGS. 8A and 8B. The carry bit of the addition of the input value to itself is the most significant bit of the input value. In this example, the carry bit is 1. The three most significant bits of the sum contains the next three data elements to be input to the linear feedback shift register. Note that the carry bit sends a single bit of input data to the remainder of the linear feedback shift register implementation. The modified input multiplexer unit 97 takes the output of the reconfigurable functional unit 91 and the carry bit from the reconfigurable functional unit 90 to produce a combined value. In this embodiment, the bottom three bits of the output of reconfigurable functional unit 91, that is 110, are used along with the carry bit from the reconfigurable functional unit 90, to produce the combined value, 1101. The output of the reconfigurable functional unit 91 is also shifted three places right in the shift register 93. The shift register 93 implements sign extension, so that the value of the most significant bit fills the entire output of the shift register 93. Note that if the most significant bit of the output of the reconfigurable functional unit 91 is a 1, then the output is 1111. If the most significant bit is a 0, the output is 0000. This value is ANDed together with the mask, in the AND unit 95. The mask stored in the register 98 effectively implements the feedback taps of the linear feedback shift register. Note that a variety of different linear shift registers can be implemented using different mask values in the register 98. The feedback taps of the LFSR of FIGS. 8A and 8B is implemented with the mask value "1010." The output of the AND 95 and the combined value are Exclusive-ORed together in the ALU 99. This produces the new output value 0111. Note that this is the same state as that stored in the registers of the LSFR of FIG. 8B.

The modified multiplexer unit 97 used in the present invention eases the implementation of the linear feedback shift register, and allows it to be implemented using just two reconfigurable functional units.

In a preferred embodiment of the present invention, the system operates on a 32-bit rather than the four-bit example shown here. Any size LFSR can be implemented using embodiments of the system of the present invention.

The reconfigurable functional unit 89 is able to produce inputs to the reconfigurable functional unit 91 along the carry bit line until a number of steps equal to the size of the word, at which point new data needs to be loaded into the reconfigurable functional unit 89. The modified input multiplexer 97 implements a shift plus the introduction of a new bit of data from the reconfigurable functional unit to produce the combined value.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A reconfigurable chip including a reconfigurable functional unit having a modified input multiplexer unit configured to select a combined value, the combined value including some of the bits from an output of the reconfigurable functional unit and at least one bit from another reconfigurable functional unit.

2. The reconfigurable chip of claim 1 wherein at least one bit from another reconfigurable functional unit is the carry bit from another reconfigurable functional unit.

3. The reconfigurable chip of claim 1 wherein said some of the bits comprise all but the most significant bit of the output of the reconfigurable functional unit shifted left one space.

4. The reconfigurable chip of claim 1 wherein the reconfigurable functional unit and another reconfigurable functional unit implements a linear feedback shift register.

5. The reconfigurable chip of claim 1 wherein the modified input multiplexer unit includes circuitry to switch between a combined value and other values.

6. The reconfigurable chip of claim 1 wherein conductive lines on the reconfigurable chip arrange the combined value as an input to a multiplexer in the modified multiplexer unit.

7. The reconfigurable chip of claim 1 wherein the combined value includes all but one bit of the output of the reconfigurable functional unit and the carry bit from another reconfigurable functional unit wherein if the most significant bit of the output of the reconfigurable functional unit is in a predetermined state, the reconfigurable functional unit is configured to provide a mask value from a register and the reconfigurable functional unit is configured to exclusive OR the combined value to a mask value to produce a new output value.

8. An implementation of a linear feedback shift register on a reconfigurable chip wherein a first reconfigurable functional unit is adapted to provide at least one input bit to a second reconfigurable functional unit, the second reconfigurable functional unit having a modified input multiplexer unit configured to select a combined value, the combined value including some of the bits from an output of the second reconfigurable functional unit and the at least one input bit from the first reconfigurable functional unit.

9. The implementation of claim 8 wherein the at least one input bit is a carry bit from the first reconfigurable functional unit.

10. The implementation of claim 9 wherein the first reconfigurable functional unit is adapted to add an input value to itself so that the carry bit contains a most significant bit of the input value.

11. The implementation of claim 8 wherein if the most significant bit of the output of the second reconfigurable functional unit is in a predetermined state, the second reconfigurable functional unit is configured to provide a mask value from a register and a second reconfigurable functional unit is configured to Exclusive-OR the combined value to the mask value to provide a new output value.

12. The implementation of claim 8 wherein the modified input multiplexer unit includes lines to provide an input of the combined value to a multiplexer in a modified input multiplexer unit.

13. The implementation of claim 8 wherein the modified input multiplexer unit allows the selection between the combined value and the output of the second reconfigurable functional unit.

14. An implementation of a linear feedback shift register on a reconfigurable chip wherein a first reconfigurable functional unit is configured to add an input value to itself so that a carry bit contains the most significant bit of the input value, the second reconfigurable functional unit having a modified input multiplexer unit configured to select a combined value, the combined value including all but one bit of the output of the second reconfigurable functional unit and the carry bit from the first reconfigurable functional unit, wherein if the most significant bit of the output of the second reconfigurable functional unit is configured to provide a mask value from a register and the second reconfigurable functional unit is configured to exclusive-OR the combined value to the mask value to produce an new output value.

15. The implementation of claim 14 wherein the modified input multiplexer unit includes conductive lines to provide the combined value as an input to a multiplexer in the modified input multiplexer unit.

16. The implementation of claim 14 wherein the modified input multiplexer unit allows the selection between the output of the second reconfigurable functional unit and the combined value.

17. The implementation of claim 14 wherein the predetermined state is a one.

18. The implementation of claim 14 wherein the mask value implements the taps on the linear feedback shift register.

19. The implementation of claim 14 wherein the mask value is ANDed together with a value that is all ones if the most significant bit of the output of the reconfigurable functional unit is a one or it's all zeros if the most significant bit of the output of the reconfigurable functional unit is a zero.

20. The method of claim 19 wherein the output of the second reconfigurable functional unit is sent to a shift register with sign extension such that the output of the shift register is the same in all bits as the most significant bit of the output of the reconfigurable functional unit.

21. The implementation of claim 14 wherein the sum of the input value and itself is used as a new input value to the first reconfigurable functional unit.

* * * * *